US006625123B1

United States Patent
Fukumoto et al.

(10) Patent No.: US 6,625,123 B1
(45) Date of Patent: Sep. 23, 2003

(54) ATM-CELL SEGMENTATION AND REASSEMBLY CIRCUIT

(75) Inventors: Keisuke Fukumoto, Tokyo (JP); Yuko Hattori, Fukuoka (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/310,864

(22) Filed: May 13, 1999

(30) Foreign Application Priority Data

May 15, 1998 (JP) .......................................... 10-150762

(51) Int. Cl.[7] .............................................. H04L 12/56
(52) U.S. Cl. .............................. 370/230.1; 370/395.1; 370/474
(58) Field of Search ............................. 370/230, 230.1, 370/235, 389, 392, 395.1, 395.6, 395.63, 398, 399, 470, 471, 474, 428, 429

(56) References Cited

U.S. PATENT DOCUMENTS

| 5,379,297 | A | * | 1/1995 | Glover et al. ............... 370/60.1 |
| 5,511,076 | A | * | 4/1996 | Ramakrishnan et al. ... 370/94.2 |
| 5,548,587 | A | * | 8/1996 | Bailey et al. ............... 370/60.1 |
| 5,742,765 | A | * | 4/1998 | Wong et al. ............. 395/200.6 |
| 5,796,735 | A | * | 8/1998 | Miller et al. ................. 370/395 |
| 5,809,024 | A | * | 9/1998 | Ferguson et al. ............ 370/395 |
| 5,815,501 | A | * | 9/1998 | Gaddis et al. ............... 370/402 |
| 5,917,828 | A | * | 6/1999 | Thompson ................... 370/474 |
| 6,026,443 | A | * | 2/2000 | Oskouy et al. .............. 709/230 |

FOREIGN PATENT DOCUMENTS

| JP | 63-88661 | 4/1988 |
| JP | 63-121342 | 5/1988 |
| JP | 5-6217 | 1/1993 |
| JP | 7-143133 | 6/1995 |
| JP | H8-46625 | 2/1996 |
| JP | 8-31069 | 3/1996 |
| JP | H9-36883 | 2/1997 |

* cited by examiner

Primary Examiner—Alpus H. Hsu
(74) Attorney, Agent, or Firm—Sughrue Mion, PLLC

(57) ABSTRACT

An ATM-cell segmentation and reassembly circuit, wherein BUS packets can be relayed at high speed without dissipating memory resources, includes a receiving-cell processing unit (100) for reassembling received cells into received packets, a transmission-cell processing unit (200) for segmenting transmission packets into transmission cells, a packet memory (300) for storing the received packets and the transmission packets, and a descriptor section (104) shared by the received-cell processing unit (100) and the transmission-cell processing unit (200) for registering reception descriptors to be used for reassembling the received cells and transmission descriptors to be used for segmenting the transmission packets, wherein a reception descriptor used for reassembling the received cells into a received packet is used as a transmission descriptor for segmenting the received packet into the transmission cells when the received packet is to be relayed towards another terminal.

7 Claims, 4 Drawing Sheets

ATM-CELL SEGMENTATION AND REASSEMBLY CIRCUIT

BACKGROUND OF THE INVENTION

The present invention relates to an ATM (Asynchronous Transfer Mode) cell segmentation and reassembly circuit to be provided in a terminal of an ATM transmission network.

In the ATM transmission network, messages from a sender terminal are transmitted being loaded on cells which are addressed to a receiver terminal designated by the sender terminal.

FIG. 4 is a block diagram illustrating a conventional cell segmentation and reassembly circuit provided in an ATM terminal for exchanging packet data by way of an ATM transmission network. The cell segmentation and reassembly circuit of FIG. 4 comprises a received-cell processing unit 500, a tranismission-cell processing unit 600, a CPU (Central Processor Unit) 700 for controlling the received-cell processing unit 500 and the transmission-cell processing unit 600, a received-packet memory 800, and a transmission-packet memory 900.

Received cells, which have been transmitted towards the ATM terminal through the ATM transmission network, are reassembled into packets by the received-cell processing unit 500 and stored in the received-packet memory 800 under control of the CPU 700. Packets to be transmitted from the ATM terminal to another terminal through the ATM transmission network are once stored in the transmission-packet memory 900, read out from the transmission-packet memory 900 and segmented by the transmission-cell processing unit 600 into cells to be transmitted towards the ATM transmission network under control of the CPU 700.

A problem of the conventional cell segmentation and reassembly circuit of FIG. 4 is that it is inconvenient for relaying BUS (Broadcast and Unknown Server) packets of LAN (Local Area Network) emulation, that is, broadcast packets, multi-cast packets or packets whereof ATM addresses are unknown, as will be described in the following paragraphs.

Packets reassembled from received cells are stored (data line 13) in the received-packets memory 800 according to control (control line 16) of the CPU 700. When a packet is to be relayed, the CPU 700 copies the packet stored in the received-packet memory 800 into the transmission-packet memory 900 (data line 14) and notifies (control line 17) the address of the packet copied in the transmission-packet memory 900 to the transmission-cell processing unit 600, whereby the packet is read out (data line 15) from the transmission-packet memory 600 and segmented into transmission cells by the transmission-cell processing unit 600 to be transmitted through the ATM transmission network.

Here, the copy of the relaying packet between the received-packet memory 800 and the transmission packet 900 and notification to the transmission-cell processing unit 600 of the address of the relaying packet stored in the transmission-packet memory 900 are both performed by software processing executed by the CPU 700, needing comparatively long time for relaying the BUS packets in the LAN emulation, Furthermore, the relaying packet uses memory resources both in the received-packet memory 800 and the transmission-packet memory 900 which should be prepared separately.

This is another problem.

SUMMARY OF THE INVENTION

Therefore, a primary object of the present invention is to resolve above problems and provide an ATM-cell segmentation and reassembly circuit wherein the BUS packets can be relayed at high speed without dissipating memory resources.

In order to achieve the object, an ATM-cell segmentation and reassembly circuit of the invention comprises:

- a receiving-cell processing unit for reassembling received cells into received packets;
- a transmission-cell processing unit for segmenting transmission packets into transmission cells;
- a packet memory for storing the received packets and the transmission packets; and
- a descriptor section shared by the received-cell processing unit and the transmission-cell processing unit for registering reception descriptors to be used for reassembling the received cells and transmission descriptors to be used for segmenting the transmission packets, wherein a reception descriptor used for reassembling the received cells into a received packet is used as a transmission descriptor for segmenting the received packet into the transmission cells when the received packet is to be relayed towards another terminal.

Each of the reception descriptors and the transmission descriptors has a common format describing information, which includes a stored address in the packet memory, VPI/VCI (Virtual Path Identifier/Virtual Channel Identifier) information and packet length, of respective one of the received packets and the transmission packets.

Data of the received packet to be relayed is read out by the transmission-cell processing unit from an address of the packet memory where the received packet to be relayed is stored by the received-cell processing unit, referring to the stored address described in the reception descriptor used for reassembling the received cells into the received packet to be relayed.

Therefore, no software processing is needed for copying data of the relaying packet from a received packet memory into another transmission packet memory, for example, or re-preparing a transmission descriptor for notifying the address of the relaying packet stored in the transmission packet memory.

Furthermore, there is no need to prepare the reception packet memory and the transmission packet memory separately, enabling efficient usage of memory resources.

BRIEF DESCRIPTION OF THE DRAWINGS

The foregoing, further objects, features, and advantages of this invention will become apparent from a consideration of the following description, the appended claims, and the accompanying drawings wherein the same numerals indicate the same or the corresponding parts.

In the drawings.

DETAILED DESCRIPTION OF THE PREFERRED EMBODIMENTS

Now, embodiments of the present invention will be described in connection with the drawings.

Figure 1:
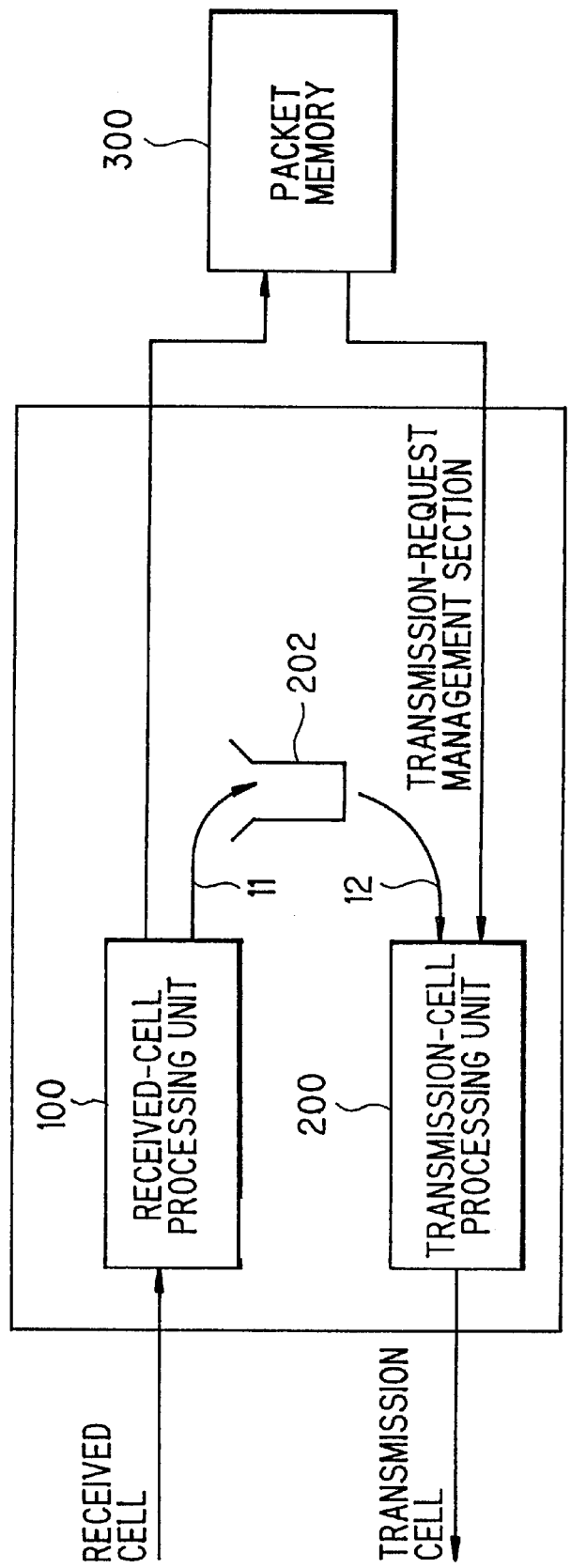
FIG. 1 is a schematic diagram illustrating a basic configuration of an ATM-cell segmentation and reassembly circuit according to an embodiment of the invention.

FIG. 1 is a schematic diagram illustrating a basic configuration of an ATM-cell segmentation and reassembly circuit according to an embodiment of the invention.

The ATM-cell segmentation and reassembly circuit of FIG. 1 comprises a received-cell processing unit 100, a transmission-cell processing unit 200, a transmission-request manager 202 and a packet memory 300. Received cells are reassembled into a packet and stored in the packet memory 300 by the received-cell processing unit 100, and, when the reassembled packet is to be relayed, the address of the descriptor used for reassembly of the packet is notified, at the same time, to the transmission-cell processing unit 200 through the transmission-request manager 202. According to the notified address, the reception descriptor used for reassembly of the packet is acquired by the transmission-cell processing unit 200 and used, as it is, for the transmission descriptor whereby the packet is read out from the packet memory 300 and segmented into cells to be transmitted.

Figure 2:
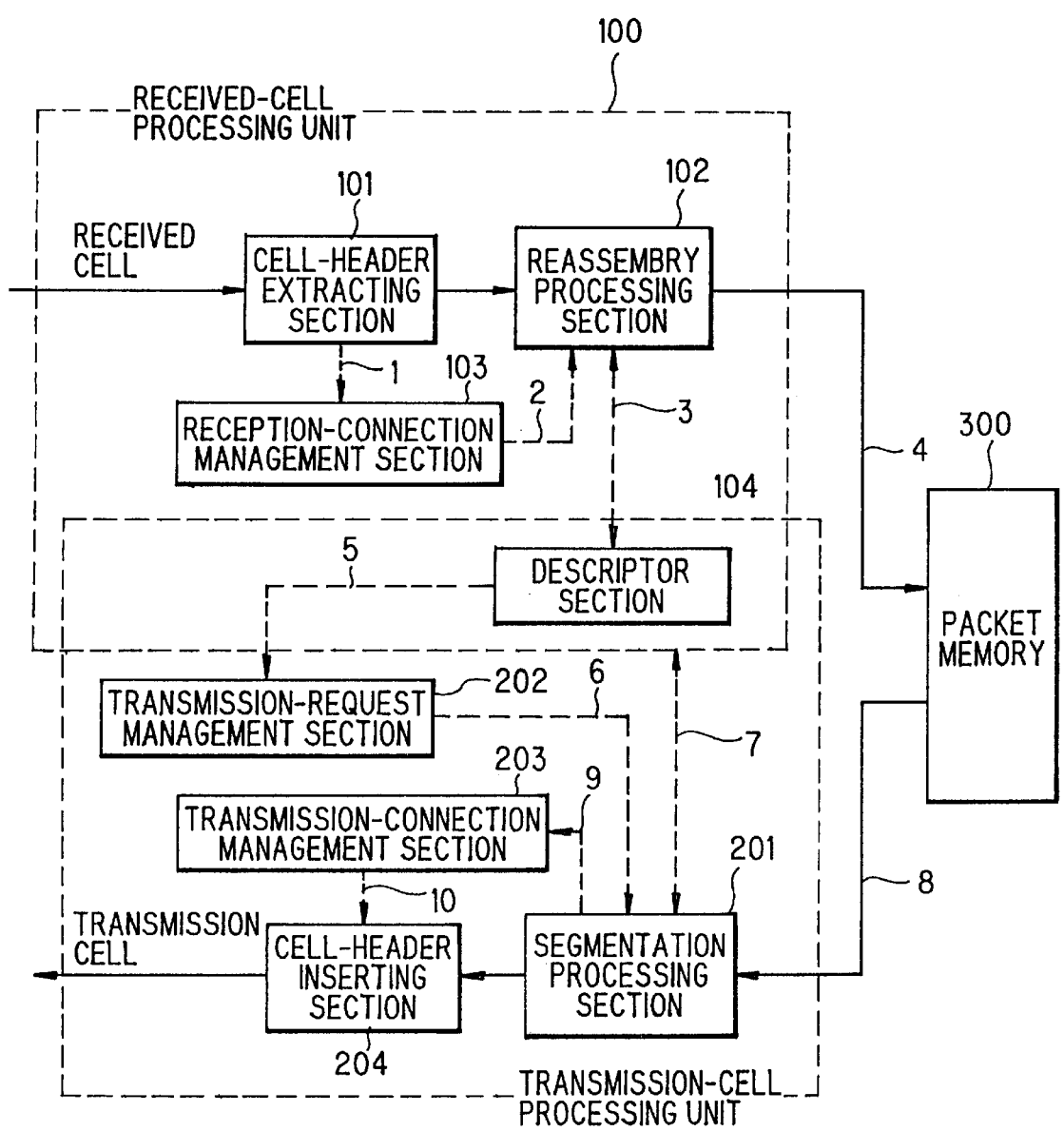
FIG. 2 is a block diagram for illustrating detailed configuration of the received-cell processing unit 100 and the transmission-cell processing unit 200 of FIG. 1.

FIG. 2 is a block diagram for illustrating detailed configuration of the received-cell processing unit 100 and the transmission-cell processing unit 200.

The received-cell processing unit 100 comprises a cell-header extracting section 101 for extracting header information of the received cells, a reception-connection management section 103 having a table for managing information of each reception connection such as descriptor addresses of the received packets or information concerning whether the received packets are to be relayed or not, and a reassembly processing section 102 for reassembling the received cells into the received packets, and shares a descriptor section 104 with the transmission-cell processing unit 200.

The transmission-cell processing unit 200 comprises the transmission-request management section 202 for managing addresses of descriptors to be used for relaying received packets, a segmentation processing section 201 for reading out the transmission packets from the packet memory 300 and segmenting them into transmission cells, a transmission-connection management section 203 for managing information of each transmission connection, and a cell-header inserting section 204 for inserting header information onto the transmission cells according to information supplied from the transmission-connection management section 203, and shares the descriptor section 104 with the received-cell processing unit 100.

Figure 3:
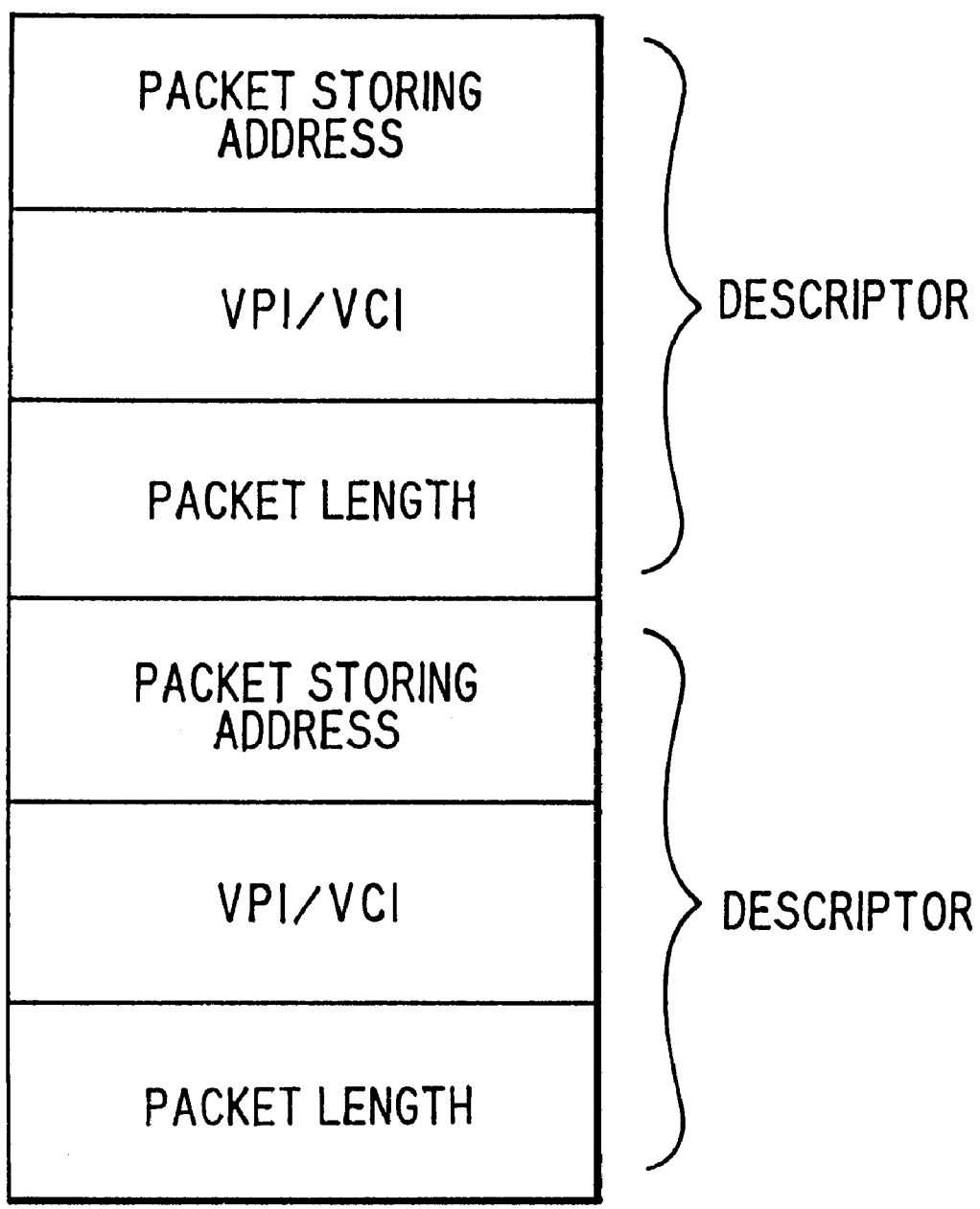
FIG. 3 is a schematic diagram illustrating a format of the descriptors registered in the descriptor section 104.

FIG. 3 is a schematic diagram illustrating a format of the descriptors which are registered in the descriptor section 104 and commonly used by the received-cell processing unit 100 and the transmission-cell processing unit 200. Each descriptor, the reception descriptor or the transmission descriptor, has the same format and includes information of an address in the packet memory 300, VPI/VCI (Virtual Path Identifier/Virtual Channel Identifier) information of the received/transmission cells and packet length of a respective received/transmission packet. Therefore, when a received packet is to be relayed, the reception descriptor used for reassembling the received cells can be applied directly to the transmission descriptor for generating transmission cells of the packets to be relayed, in the invention.

Now, operation of the ATM-cell segmentation and reassembly circuit of FIG. 2 is described.

For the first, reassembly and segmentation of a packet not to be relayed is described.

When a cell is received by the received-cell processing unit 100, header information is extracted from the received cell by the cell-header extracting section 101. With the VPI/VCI information included in the extracted header information, the reception-connection management section 103 is accessed (control line 1) for discriminating whether the packet of the received cell is to be relayed or not.

By referring to the table for managing information of each reception connection such as the descriptor address of the received packet or information concerning whether the received packet is to be relayed or not, the reception-connection management section 103 determines that the packet of the received cell is not to be relayed, and notifies the descriptor address read out from the table according to the VPI/VCI information to the reassembly processing section 102 (control line 2).

The reassembly processing section 102 gets a reception descriptor from the descriptor section 104 (control line 3) making use of the notified descriptor address, and reassembles the received cell into a received packet to be stored (data line 4) in the packet memory 300 according to the reception descriptor.

When a packet is to be transmitted from the ATM terminal to another terminal, the segmentation processing section 201 gets a transmission descriptor (control line 7) from the descriptor section 104 and reads out the packet from the packet memory 300 (data line 8) according to the transmission descriptor. The packet is segmented into transmission cells and VPI/VCI information of the transmission descriptor is notified to the transmission-connection management section 203 (control line 9), wherein a table is prepared for managing switching information of each transmission connection such as an output port number of the transmission cells. The transmission-connection management section 203 outputs header information to the cell-header inserting section (control line 10) referring to the table with the notified VPI/VCI information, and the cell-header inserting section 204 inserts cell headers onto the transmission cells according to the header information.

Thus, ordinary packets, that is, packets not to be relayed, are received or transmitted from/to the ATM transmission network through the ATM-cell segmentation and reassembly circuit of FIG. 2.

When received cells are found to be cells of a BUS packet to be relayed by the reception-connection management section 103 referring to the table according to VPI/VCI information of the received cells, the descriptor address described in the table is notified to the reassembly processing section 102 (control line 2), whereby the reassembly processing section 102 gets a reception descriptor from the descriptor section 104 (control line 3) and reassembles the received cells into a received packets to be stored in the packet memory 300 (data line 4) according to the reception descriptor, in the same way with ordinary packets.

After the received packet is stored in the packet memory 300, the descriptor section 104 notifies the descriptor address of the reception descriptor used for reassembling the received packet to be relayed (control line 5) to the tranismission-request management section 202. The transmission-request management section 202, which takes charge of managing descriptor addresses of the reception descriptors used for the received packets to be relayed, informs the segmentation processing section 201 (control line 6) of the notified descriptor address, whereby the segmentation processing section 201 gets the reception descriptor from the descriptor section 104.

As previously described, the reception descriptor, having the same format with the transmission descriptor, can be used as a transmission descriptor, and so, using the reception descriptor as a transmission descriptor, the segmentation processing section 201 reads out the packet to be relayed from the packet memory 300 (data line 8) according to the stored address described therein.

Thus, the received packet to be relayed is read out and again segmented into transmission cells to be transmitted to the ATM transmission network after added with cell headers by the cell-header inserting section 204 according to header information retrieved by the transmission-connection management section 203, in the same way with the ordinary packets.

As heretofore described, processing time needed for relaying BUS packets can be reduced in the ATM-cell segmentation and reassembly circuit according to the invention.

This is because the reception descriptor can be used directly as the transmission descriptor of the received packet to be relayed, and therefore, data of the received packet stored in the packet memory 300 can be directly read out as data of a packet to be transmitted by accessing the packet memory 300 with the stored address described in the reception descriptor, needing no software processing for copying data of the relaying packet from a received packet memory into another transmission packet memory, for example, or re-preparing a transmission descriptor for notifying the address of the relaying packet stored in the transmission packet memory.

Figure 4:
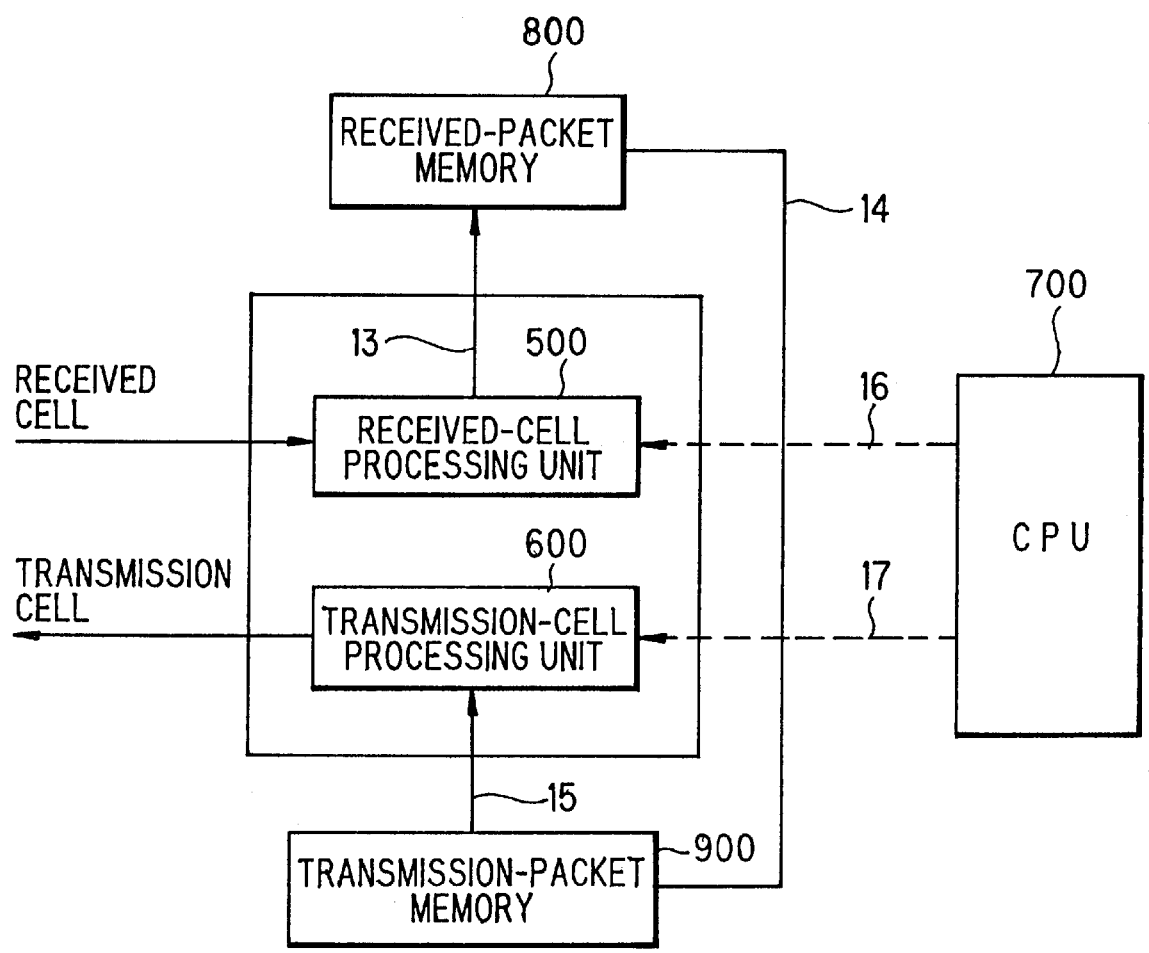
FIG. 4 is a block diagram illustrating a conventional cell segmentation and reassembly circuit.

Furthermore, the management of the reception/transmission descriptors of the BUS packets to be relayed can be performed by hardware processing, that is, by IC (Integrated Circuit) chips independent of the CPU. Therefore, processing of the BUS packets can be performed still quickly in the ATM-cell segmentation and reassembly circuit of the invention compared to the conventional cell segmentation and reassembly circuit of FIG. 4.

Still further, memory resources can be used efficiently in the ATM-cell segmentation and reassembly circuit of the invention, because there is no need to prepare the reception packet memory and the transmission packet memory separately whereof both store the same data for the BUS packets to be relayed.

What is claimed is:

1. An ATM (Asynchronous Transfer Mode) cell segmentation and reassembly circuit comprising:
    a receiving-cell processing unit for reassembling received cells into received packets;
    a transmission-cell processing unit for segmenting transmission packets into transmission cells;
    a packet memory for storing the received packets and the transmission packets; and
    a descriptor section shared by the received-cell processing unit and the transmission-cell processing unit for registering reception descriptors to be used for reassembling the received cells and transmission descriptors to be used for segmenting the transmission packets, wherein a reception descriptor used for reassembling the received cells into a received packet is used as a transmission descriptor for segmenting the received packet into the transmission cells when the received packet is to be relayed towards another terminal.

2. An ATM-cell segmentation and reassembly circuit as recited in claim 1; wherein:
    each of the reception descriptors and the transmission descriptors has a common format describing information, which includes a stored address in the packet memory, VPI/VCI (Virtual Path Identifier/Virtual Channel Identifier) information and packet length, of respective one of the received packets and the transmission packets.

3. An ATM-cell segmentation and reassembly circuit as recited in claim 2; wherein:
    data of the received packet to be relayed is read out by the transmission-cell processing unit from an address of the packet memory where the received packet to be relayed is stored by the received-cell processing unit, referring to the stored address described in the reception descriptor used for reassembling the received cells into the received packet to be relayed.

4. An ATM-cell segmentation and reassembly circuit as recited in claim 1; the received-cell processing unit comprising:
    a cell-header extracting section for extracting header information from the received cells; and
    a reception-connection management section having a table to be referred to with the VPI/VCI information included in the header information, for obtaining a descriptor address in the descriptor section of a reception descriptor to be used for reassembling the received cells into a received packet, and discriminating whether the received packet reassembled from the received cells is to be relayed or not.

5. An ATM-cell segmentation and reassembly circuit as recited in claim 4; wherein:
    the descriptor address of the reception descriptor is notified to the transmission-cell processing unit after the received packet is stored in the packet memory, when the received packet is discriminated to be relayed upon referring to the table.

6. An ATM (Asynchronous Transfer Mode) cell segmentation and reassembly circuit comprising:
    a receiving-cell processing unit for reassembling received cells into receive packets;
    a transmission-cell processing unit for segmenting transmission packets into transmission cells;
    a packet memory for storing the received packets and the transmission packets; and
    a descriptor section shared by the received-cell processing unit and the transmission-cell processing unit for registering reception descriptors for reassembling the received cells and transmission descriptors for segmenting the transmission packets, wherein a reception descriptor for reassembling the received cells into a received packet is set as a transmission descriptor for segmenting the received packet into the transmission cells when the received packet is to be relayed towards another terminal.

7. A method for cell segmentation and reassembly in an ATM network, comprising:
    registering a reception descriptor;
    using the reception descriptor to reassemble received cells into a received packet;
    registering a transmission descriptor;
    using the transmission descriptor to segment a transmission packet into transmission cells;
    storing received packets and transmission packets in a common memory;
    when the received packet is to be relayed towards another terminal, using the reception descriptor of the received packet as the transmission descriptor of the transmission packet.

* * * * *